Patented Jan. 23, 1940

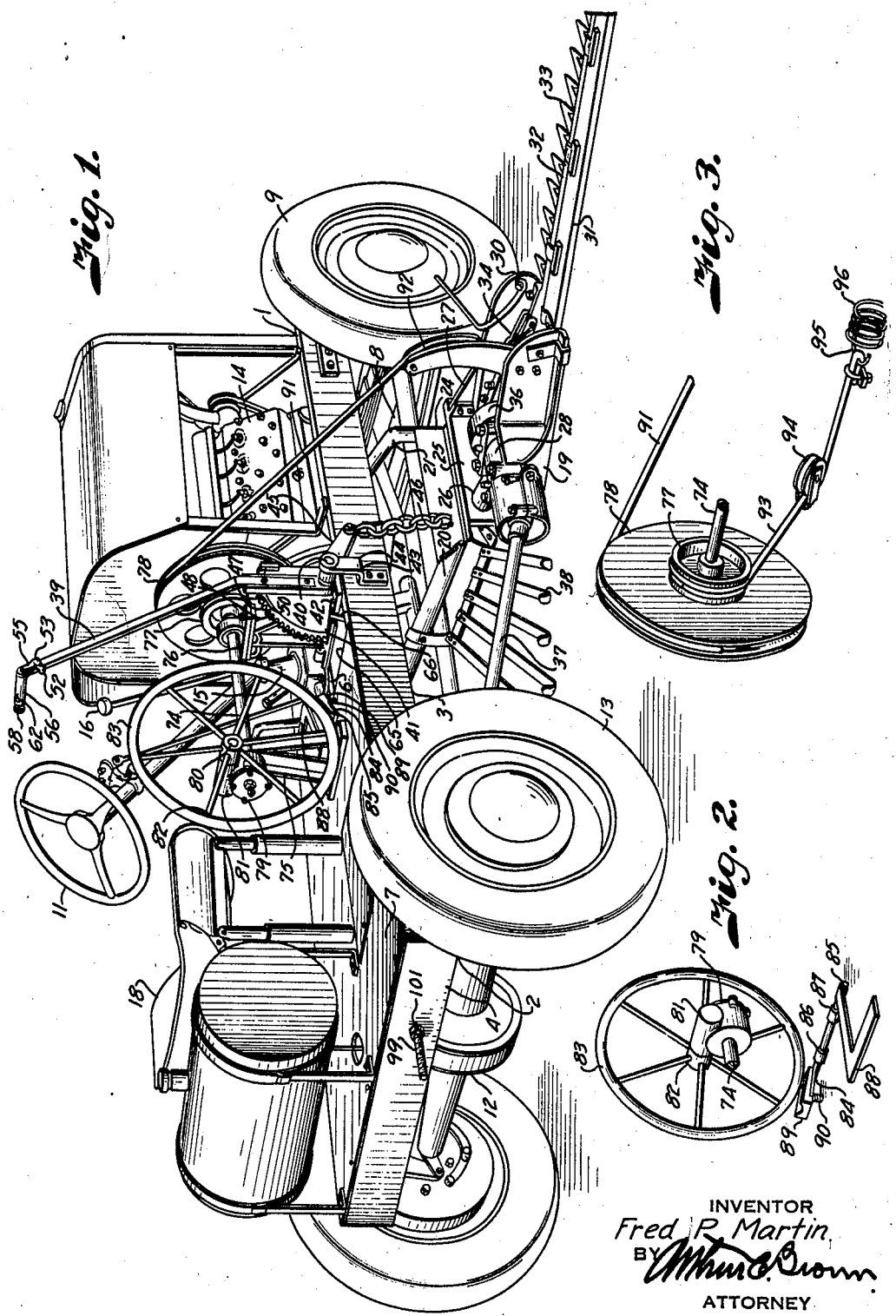

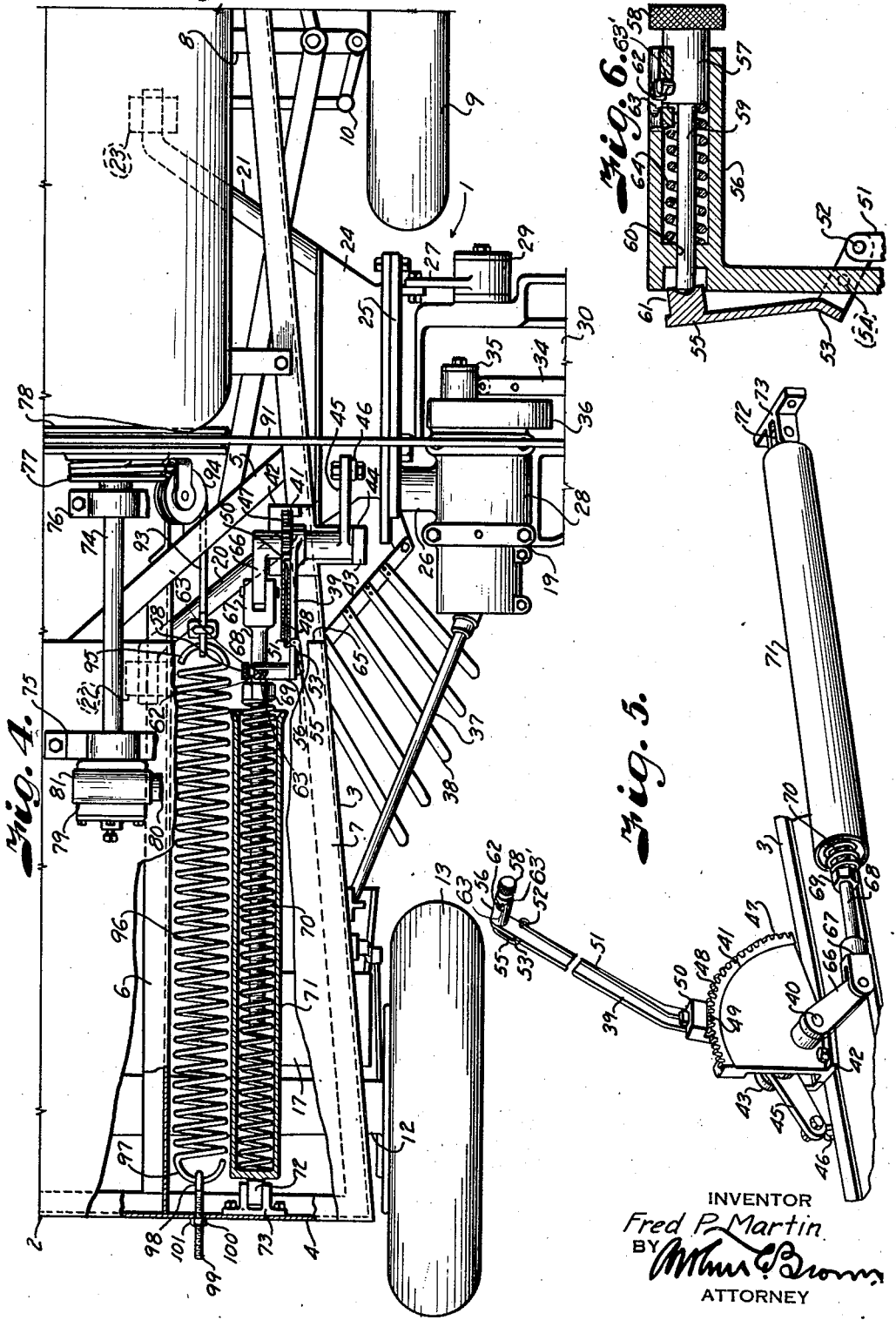

2,187,981

UNITED STATES PATENT OFFICE 2,187,981

MOWING MACHINE

Fred P. Martin, Topeka, Kans.

Application April 1, 1938, Serial No. 199,474

16 Claims. (Cl. 56—25)

This invention relates to mowing machines particularly adapted for cutting vegetation along the sides of a highway and which is constructed so that the sickle is readily adjusted to closely follow irregular surfaces, such as shoulders, back slopes, drainage ditches, cuts and fills.

The principal object of the invention is to provide the sickle with a counterbalancing mechanism to facilitate positioning of the sickle in following the irregular surfaces.

Other important objects of the invention are to provide an improved lifting mechanism for selectively varying the cutting height of the sickle; to provide a simple, easily and quickly actuated mechanism for changing the cutting angle of the sickle through a cutting range for subsantially 180° with respect to the vertical; to provide more effective leverage in the sickle positioning mechanisms without materially reducing the speed of control; and to provide release of the height adjusting mechanism for complete control of the sickle and shoe by the angle changing mechanism when the sickle is lowered from transporting position.

It is a further object to provide the sickle raising lever with a locking mechanism whereby the height of the sickle is positively retained in any adjusted position.

In accomplishing these and other objects of the invention, as hereinafter pointed out, I have provided improved details of structure, the preferred form of which is illustrated in the accompanying drawings, wherein:

Fig. 1 is a perspective view of a power driven mowing machine embodying the features of the present invention.

Fig. 2 is a detail perspective view of the hand wheel and its brake mechanism for changing angularity of the sickle.

Fig. 3 is a detail perspective view of the pulleys for winding the lifting and counterbalancing cables.

Fig. 4 is a plan view of the sickle side of the mowing machine, a part of the platform being broken away to better illustrate the counterbalancing springs.

Fig. 5 is a detail perspective view of the hand lever and counterbalance for controlling the cutting height of the sickle.

Fig. 6 is a detail section through the handle grip of the lever illustrated in Fig. 5, and particularly illustrating the pawl release mechanism.

Referring more in detail to the drawings:

1 designates a mowing machine including a mobile chassis 2, the frame of which includes slightly converging side sills 3 connected by end and intermediate transverse members 4 and 5, the end and transverse members being connected by longitudinal members 6 to rigidly support a floor or platform 7. The front of the frame is carried upon an axle 8 and wheels 9, having steering knuckles 10 that are adapted to be steered by a mechanism including a steering wheel 11, as in conventional automotive practice. The rear end of the frame is supported by a conventional axle unit 12, having wheels 13 that are driven from a motor 14 through a transmission 15 to give a plurality of forward speeds and one in reverse, through shifting of a lever 16. The motor 14 is mounted at the front of the chassis frame and also drives the sickle mechanism through a power takeoff connection, indicated by the housing 17.

Located on one side of the platform, to the rear of the steering wheel 11, is the driver's seat 18 from which the various controls are readily available to the reach of the operator. The sickle unit 19 is pivotally connected below the righthand side of the chassis frame by outwardly converging arms 20 and 21 having their inner ends journalled in brackets 22 and 23, as indicated in Fig. 4. The converging ends of the arms are connected by a cross member 24, including a longitudinal plate 25 which mounts spaced brackets 26 and 27 that are located in approximate alignment with the wheels 9 and 13, as best illustrated in Fig. 4. The rear bracket 26 carries a drive housing 28 which cooperates with a baring 29 on the bracket 27 to pivotally mount a sickle shoe 30 carrying a sickle 31.

The sickle 31 includes a reciprocating bar 32, having cutting blades movable relatively to sickle guards 33, as in conventional sickle construction. The bar 32 is reciprocated by means of a pitman 34, having connection with a wrist pin 35 of an eccentric 36. The eccentric 36 is fixed on a drive shaft contained within the housing 28 and rotates about the pivotal axis of the sickle so as to avoid changing relative position of the sickle blades to the guards 33 upon pivotal adjustment of the sickle. The drive shaft is actuated from the power takeoff 17 through a telescoping shaft 37 having universal connection with the eccentric drive shaft to permit raising and lowering of the shoe and heel of the sickle through a substantial range. The telescoping shaft 37 is protected by a plurality of guard fingers 38 that are carried from the arm 5.

The entire sickle unit, including the shoe, is thus mounted to swing about the axis of the bearing brackets 22 and 23 to change the elevation of the shoe and heel of the sickle and the sickle 21 is adapted to swing about the axis of the eccentric drive shaft through an angle of substantially 180° with respect to the vertical at any selected elevated position of the shoe.

In order to raise and lower the sickle unit and to support it in any selected elevational position, I provide a raising and lowering mechanism, as now to be described. The raising and lowering mechanism includes a hand lever 39 fixed to a shaft 40 that is oscillatably journalled at one end in a rack plate 41 having a flanged foot portion 42 secured on the side sill 3. The opposite end of the shaft is supported by a bracket 43 attached to the side of the sill and having an offset bearing portion 44 to accommodate the lever 39 and a lever arm 45, also fixed to the shaft 40. The free end of the arm 45 projects forwardly of the machine alongside the sill 3 and carries a flexible connection 46 which is attached to the cross member 24, previously described. The rack plate 41 includes an arcuate periphery 47, having a plurality of notches 48 adapted to be engaged by a spring pressed pawl 49 that is slidable in a laterally extending lug 50 on the lever. The pawl is released by a rod 51 extending along the body of the lever and pivotally connected, as at 52, with a bell crank 53. The bell crank 53 is pivoted to the lever, as at 54, and has an arm 55 extending upwardly to terminate adjacent a laterally extending handle 56. The handle 56 is tubular to provide a recess for housing a plunger 57 having a thumb engaging knob 58 projecting from the end thereof and a shank 59 slidable in an opening 60 to engage a lug 61 on the arm 55 of the bell crank. The plunger is retained in the handle by a pin 62 extending through a slot 63 in the handle and which has a pin seating notch 63'. The plunger is normally retained in retracted position by a coil spring 64 that is sleeved over the shank 59 and has one end bearing against the body of the plunger 57 and its opposite end against the bottom of the recess. To release the pawl the button 59 is engaged by the thumb and pressed inwardly against action of the spring 64 which rocks the bell crank 53 and lifts the rod 51 to move the pawl from one of the notches 48. Upon release of the knob, the spring 64 and the pawl spring return the parts to normal position. The pawl may be selectively retained in released position by rotating the knob 58 to seat the pin 62 in the notch 63', as later described.

Fixed on the shaft 40 and extending downwardly through an opening 65 in the platform, is an arm 66 that is pivotally connected with a yoke-shaped head 67 of a rod 68. The rod 68 is threaded to mount a nut 69 thereon which is engaged by one end of a compression spring 70 having its opposite end bearing against the bottom of a tubular housing 71 which encloses the spring. The closed end of the tubular housing has an ear 72 that is pivotally connected with a bracket 73 fixed to the end member 4 of the frame. The nut 69 is threaded on the rod to compress the spring to the point where it almost balances the sickle unit when the pawl of the actuating lever is released.

In order to swing the sickle bar about its pivotal axis, as when adjusting the angular position thereof, I provide an actuating mechanism as now to be described. This mechanism includes a shaft 74 which extends longitudinally of the chassis alongside the driver's seat and has its ends rotatably mounted in bearing brackets 75 and 76. Fixed on the forward end of the shaft are grooved pulleys 77 and 78 of differential diameter. Carried by the bracket at the rear end of the shaft is a housing 79 for enclosing a worm gear (not shown), that is fixed on the shaft 74 and a worm (also not shown), that is mounted on a horizontally extending shaft 80 rotatably mounted in a transverse extension 81 of the housing. Fixed on the outer end of the shaft 80 is a hand wheel 82 having a rim 83 adapted to be engaged by a brake mechanism 84. The brake mechanism 84 includes a rock shaft 85 that is mounted on the platform in bearings 86 and 87. Fixed to one end of the shaft is a foot pedal 88 to rock the shaft to move a brake shoe 89 on the opposite end from engagement with the rim of the wheel, the brake shoe 89 being normally retained in engagement with the wheel by a compression spring 90 having one end engaging under its shoe and its opposite end against the floor of the platform. Fixed within the groove of the larger pulley 78 is the end of a cable 91, having its opposite end extending over an arcuate arm 92 that is fixed to the sickle shoe and which projects upwardly therefrom, as best shown in Fig. 1, the free end of the cable being rigidly attached to the sickle bar so that when the pulley 78 is rotated to wind the cable thereon, the sickle is raised from a substantially vertical position in a downward direction to a substantially vertical position in an upward direction.

In order to balance the sickle and facilitate rotation of the hand wheel, the smaller pulley 77 carries a cable 93, having one end fixed thereto and its opposite end extending over a guide sheave 94 and connected with a hooked end 95 of a tension spring 96. The opposite end 97 of the tension spring is engaged in the eye of a bolt 98 having a threaded shank 99 extending through an opening 100 in the end member 4 of the frame and provided with a nut 101 whereby the spring is tensioned to substantially balance the sickle and assist in positioning of the sickle upon actuation of the hand wheel 82.

Assuming that the lever 39 is in retracted position and the pawl thereon engaged with one of the lower notches in the rack, the heel of the sickle is retained in its highest position to allow ample clearance thereunder when the mowing machine is being transported from one place of operation to another. When thus transported, the cable 91 is wound upon the pulley 78 to support the sickle in substantially upright position, preferably inclining inwardly toward the chassis. Assuming that the machine is used to cut along the shoulder of a road, the thumb of the operator is pressed against the plunger 57 and the knob 58 rotated to seat the pin 62 in the notch 63' to effect release of the pawl 49. The lever 39 is then free to lower the sickle carrier but since the upper end of the sickle post is in perpendicular position and substantially balanced, the lever will remain practically stationary. The lever 39 is then left free with the pawl unlocked, whereupon the hand wheel is rotated upon release of the brake 84. As the wheel 82 is rotated the cable 91 will unwind from the pulley 78 and control downward movement of the shoe and heel of the sickle, while the outer end of the sickle is moving in a downwardly sweeping arc. When the shoe and heel portion of the sickle is lowered to the desired point the knob 58 is rotated to unseat the pin 62 from the notch 63' and the spring 64 causes the pawl of the lever 39 to engage the rack 41 to hold the shoe at the proper elevation. The outer end of the sickle is then adjusted to the inclination of the shoulder upon rotation of the hand wheel in the proper direction. For example, assuming that the shoulder slopes upwardly from the face of the road, the hand wheel is rotated in an anticlockwise direction, Fig. 1, to wind the cable 91 on the pulley until the sickle is in proper position. Release of the brake then retains the hand wheel in fixed position to support the sickle at the desired cutting angle. Assuming that the shoulder slopes downwardly from the road, the hand wheel will be rotated to move the pulley in the opposite direction and effect unwinding thereof under control of the spring 96 since the cable 92 is wound on the pulley 77. Downward progress of the sickle is checked whenever the hand wheel is released and the brake engaged.

It is obvious that the heel of the sickle is adapted to be raised or lowered to accommodate the height of a shoulder, and the angularity of the sickle is readily adjustable so that it may be operated through substantially 180° or from an up position to a substantially straight down position. The springs are so adjusted that they substantially balance the sickle in any of its selected positions and it requires very little effort on the part of the operator to move the sickle to any desired cutting angle and elevation. Attention is directed to the fact that the worm and worm gear connection between the shafts 74 and 80 is such as to support the sickle in any selected position. However, the brake 89 is included as a safety factor and to prevent dislodgment of the sickle from any selected cutting position incidental to vibration.

What I claim and desire to secure by Letters Patent is:

1. In a machine of the character described, a mobile frame, a sickle, means pivotally mounting the sickle on said frame, a cable winding member rotatably supported on said frame, a cable connecting the winding member with the sickle, means on the frame for actuating the winding member, counterbalance means, a connecting member fixed relatively to the winding member, and means connecting the counterbalance means with the connecting member for substantially counterbalancing the sickle through said cable and cable winding member.

2. In a machine of the character described, a mobile frame, a sickle, means pivotally mounting the sickle on said frame, a pair of differentially sized pulleys mounted on said frame, a cable connecting one of the pulleys with the sickle, a cable wound on the other pulley, counterbalance means connected with said last named cable, and means for rotating the pulleys to effect pivotal movement of the sickle.

3. In a machine of the character described, a mobile frame, a sickle, means pivotally mounting the sickle on said frame, a pair of differentially sized pulleys mounted on said frame, a cable connecting one of the pulleys with the sickle, a cable wound on the other pulley, counterbalance means connected with said last named cable, a worm gearing connected with the pulleys, and a hand wheel for actuating said gearing.

4. In a machine of the character described, a mobile frame, a sickle, means pivotally mounting the sickle on the frame, a pair of pulleys mounted on the frame, a cable connecting one of the pulleys with the sickle, a cable wound on the other pulley, counterbalance means connected with said last named cable, a worm gearing connected with the pulleys, a hand wheel for actuating said gearing, and a brake engaging the hand wheel.

5. In a machine of the character described, a mobile frame, a sickle, a sickle carrying frame, means for movably connecting the sickle carrying frame on the mobile frame, means mounting the sickle on the sickle carrying frame, means for raising and lowering the sickle carrying frame to change the elevation of the sickle, a counterbalance spring, a leverage exerting member connected with said raising and lowering means, and means connecting the spring with said leverage exerting member for counterbalancing the sickle including said sickle carrying frame through said connection with the raising and lowering means.

6. In a machine of the character described, a mobile frame, a sickle carrying frame, means for movably connecting the sickle carrying frame with the mobile frame, a sickle carried by said sickle carrying frame, a rock shaft on the mobile frame having radially extending arms, means connecting one of the arms with the sickle carrying frame, counterbalancing means connected with the other of said arms, and a rocking lever fixed to said shaft to effect raising and lowering of the sickle carrying frame to change the elevation of the sickle.

7. In a machine of the character described, a mobile frame, a sickle carrying frame, means for movably supporting the sickle carrying frame on the mobile frame, a sickle carried by said movably supported frame, means for moving the sickle on the sickle carrying frame including means for lowering the sickle carrying frame relatively to the mobile frame, a rock shaft on the mobile frame having radially extending arms, means connecting one of the arms with the sickle carrying frame, counterbalancing means connected with the other of said arms, a lever for rocking said shaft to effect raising and lowering of the sickle carrying frame to change the elevation of the sickle, a rack on the mobile frame, a pawl on the lever for engaging the rack to secure the sickle carrying frame in adjusted position, and means for releasing the pawl to lower the sickle carrying frame through said sickle moving means.

8. In a machine of the character described, a mobile frame, a sickle, a sickle carrying frame, means for movably supporting the sickle carrying frame on the mobile frame, means pivotally mounting the sickle on the sickle carrying frame, means for raising and lowering the sickle carrying frame to change the elevation of the sickle, counterbalance means connected with said raising and lowering means, means for moving the sickle on said pivotal mounting, and counterbalancing means for facilitating pivotal movement of said sickle.

9. In a machine of the character described, a mobile frame, a sickle, a sickle carrying frame, means mounting the sickle carying frame for movement on the mobile frame, means pivotally mounting the sickle on the sickle carrying frame, a pair of pulleys mounted on the mobile frame, a cable connected with one of the pulleys and with the sickle, a cable wound on the other pulley, counterbalance means connected with said last named cable, a worm gearing connected with the pulleys, a hand wheel for actuating said gearing, a brake engaging the hand wheel, and means including a counterbalance for effecting movement of the sickle carrying frame to change the cutting height of the sickle.

10. In a machine of the character described, a mobile frame, a sickle, a sickle carrying frame pivoted to the mobile frame, means pivotally mounting the sickle on the sickle carrying frame, means for raising and lowering the sickle carrying frame to change the elevation of the sickle, means connected with said raising and lowering means for counterbalancing the sickle including said sickle carrying frame, and means for pivotally moving the sickle on said carrying frame including means for lowering and supporting the sickle carrying frame.

11. In a machine of the character described, a mobile frame, a sickle, means pivotally mounting the sickle on the frame, a pair of pulleys mounted on the frame, a cable connected with one of the pulleys and with the sickle, a cable wound on the other pulley, counterbalance means connected with said last named cable, a worm gearing connected with the pulleys, a hand wheel for actuating said gearing, and elevating means on the frame for changing the cutting height of the sickle.

12. In a machine of the character described, a mobile frame, a sickle carrying frame pivotally supported on the mobile frame, a sickle carried by said pivotally supported frame, a rock shaft on the mobile frame having radially extending arms, means connecting one of the arms with the sickle carrying frame, a compression spring carried on the mobile frame and connected with the other of said arms acting to counterbalance the sickle, and a lever for rocking said shaft to effect raising and lowering of the sickle carrying frame to change the elevation of the sickle.

13. In a machine of the character described, a mobile frame, a sickle, a sickle carrying frame, means for raising and lowering the sickle carrying frame, means pivotally mounting the sickle on the frame, means for moving the sickle on said pivotal mounting, latch means for locking said sickle frame raising and lowering means in selected position, release means for selectively releasing said latch means to effect lowering control of the sickle by said last named means independently of the raising and lowering means, and counterbalancing means for facilitating movement of said sickle.

14. In a machine of the character described the combination of means for supporting a sickle, means pivotally mounting the sickle on said supporting means for swinging movement through an arc of approximately 180°, means balancing the weight of the sickle through said range of movement, a second balancing means connected with the supporting means for balancing the sickle including said supporting means, means for raising and lowering the sickle on said pivotal mounting, and means for raising and lowering said supporting means.

15. In a machine of the character described, a mobile frame, a sickle carrying frame pivotally mounted on the mobile frame, a sickle pivotally mounted on said carrying frame, means on the mobile frame and connected with the sickle carrying frame for raising and lowering the sickle carrying frame, latch means for locking said raising and lowering means, means for releasing said latch means, and means on the mobile frame and connected with the sickle for pivoting the sickle on said sickle carrying frame and for raising and lowering the sickle carrying frame.

16. In a machine of the character described, a mobile frame, a sickle carrying frame pivotally mounted on the mobile frame, a sickle pivotally mounted on said carrying frame, means on the mobile frame and connected with the sickle carrying frame for raising and lowering the sickle carrying frame, means on the mobile frame and connected with the sickle for pivoting the sickle on said sickle carrying frame and for raising and lowering the sickle carrying frame, latch means for locking the sickle carrying frame raising and lowering means, and means for releasing said latch means when the carrying frame is to be lowered by said sickle pivoting means.

FRED P. MARTIN.